(12) United States Patent
Ramírez Blanco et al.

(10) Patent No.: US 8,091,829 B2
(45) Date of Patent: Jan. 10, 2012

(54) LIFTING STRUCTURE FOR AIRCRAFT

(75) Inventors: Gonzalo Ramírez Blanco, Madrid (ES); Daniel Barroso Vloedgraven, Alcorcon (ES); Jose Luis Lozano García, Getafe (ES); Miguel Luque Buzo, Madrid (ES)

(73) Assignee: Airbus Operations, S.L., Madrid (ES)

( * ) Notice: Subject to any disclaimer, the term of this patent is extended or adjusted under 35 U.S.C. 154(b) by 467 days.

(21) Appl. No.: 12/073,770

(22) Filed: Mar. 10, 2008

(65) Prior Publication Data

US 2009/0159742 A1 Jun. 25, 2009

(30) Foreign Application Priority Data

Dec. 21, 2007 (ES) .................................. 200703393

(51) Int. Cl.
*B64C 3/18* (2006.01)
(52) U.S. Cl. ............. 244/123.1; 244/123.12; 244/123.6; 244/123.7; 244/124; 244/131
(58) Field of Classification Search ............... 244/123.1, 244/123.12–123.6, 123.7, 123.8, 123.9, 124, 244/131
See application file for complete search history.

(56) References Cited

U.S. PATENT DOCUMENTS

| | | | | |
|---|---|---|---|---|
| 2,567,124 A | * | 9/1951 | Roberts | 244/124 |
| 2,838,260 A | | 6/1958 | Christensen | |
| 4,481,703 A | * | 11/1984 | Scott | 29/525.06 |
| 4,662,587 A | * | 5/1987 | Whitener | 244/117 R |
| 5,288,355 A | * | 2/1994 | Leffel et al. | 156/156 |
| 6,386,481 B1 | * | 5/2002 | Kallinen | 244/123.1 |
| 6,786,452 B2 | * | 9/2004 | Yamashita et al. | 244/123.1 |
| 2004/0011927 A1 | * | 1/2004 | Christman et al. | 244/131 |
| 2010/0170986 A1 | | 7/2010 | Lafly et al. | |

FOREIGN PATENT DOCUMENTS

FR 966757 10/1950
WO 2008/152248 12/2008

OTHER PUBLICATIONS

M. C. Niu, "Airframe Structural Design," Conmilit Press Ltd., Hong Kong, pp. 282 and 283, Feb. 2002.

* cited by examiner

*Primary Examiner* — Tien Dinh
*Assistant Examiner* — Justin Benedik
(74) *Attorney, Agent, or Firm* — Wenderoth, Lind & Ponack, L.L.P.

(57) ABSTRACT

A lifting structure for aircraft is essentially applicable to a horizontal stabilizer that includes two side symmetrical boxes that converge at one end (its root) thereof in a shared center area in order to connect integrally in the central area. Both boxes connect by a single part that constitutes a center rib with a double T-shaped profile. The root of the side boxes overlap converging on the inside surfaces of the wings of the center rib. The connection is ensured with rivets (lap joint). The proposed connection simplifies the assembly process (single part) and lead to a weight reduction since a carbon fiber connecting rib can be used.

9 Claims, 3 Drawing Sheets

LIFTING STRUCTURE FOR AIRCRAFT

OBJECTIVE OF THE INVENTION

The present invention, as described in the heading of this descriptive report, refers to a lifting structure for aircraft that is used essentially as a horizontal stabilizer situated in the rear area of the aircraft. The stabilizer consists in principal of two symmetrical, lateral boxes that remain solid due to certain characteristic joining methods that enable us to use a single, lighter material, such as carbon fibre.

Furthermore, the structure of the invention has a characteristic design that enables us to achieve a higher level of performance and effectiveness.

BACKGROUND TO THE INVENTION

At present, the union of lateral boxes for lifting structures for aircraft consists of a central metallic box that provides wings for inserting and riveting the lateral boxes. These in all cases have a flat structure, normally sloping upwards towards their free extremities.

Another known solution is a joint that incorporates upper or lower formers in titanium, with a central ribbing made of carbon fibre.

A third solution consists of a double shear joint.

This consists of upper and lower partial formers installed in the interior of the box, with exterior plates and central ribbing in composite material, creating a double shear joint.

Another known solution is a joint that includes a former in several sections.

In this case it consists of partial upper and lower formers installed from the outside of the box with a central ribbing in composite material.

Another solution incorporates formers in several places together with lattice ribbing. In this case it consists of partial upper and lower formers installed from the outside of the box with a central ribbing formed by bars in a latticed structure made from composite material.

DESCRIPTION OF THE INVENTION

The lifting structures for aircraft that constitutes the object of the invention is characterised by a single, central, integral component which acts as the nexus for joining a number of symmetrical lateral boxes to form a horizontal stabilizer.

The joint between the integral component and the side boxes is complemented by some strong rivets that are inserted from inside, into aligned holes made previously in superimposed laminated sections belonging to the three parts of the structure previously mentioned.

The central piece consists of a configuration in the form of a double "T", the extremities of which incorporate a number of flaps, at the rear and front, positioned perpendicularly at the extremities from the core of this central piece, which make their union to the rear and front lifting possible.

In addition, the lifting structure assembly has a characteristic, curved configuration when seen from the front. This is such that in the areas where they meet the integral central component, the lateral boxes have extremities that make further contact with the internal faces of the profile's wings in the form of a double "T", incorporating the rivets precisely in these contact areas.

In this way, then, the incorporation of a single one-piece part to join the two lateral boxes together makes the following possible:

Joining the materials involved (carbon fibre), increasing the percentage of composite material as much as possible Improving the processes of drilling and riveting by eliminating different materials, achieving improvements in tolerances and saving time making holes, as well as reducing non-conformities.

Significant improvement for the client in terms of inspection and maintenance, by not incorporating metallic materials.

A substantial improvement in the joint is also achieved, simplifying the assembly process.

Finally it should be pointed out that internal drilling and riveting of the box is practically eliminated, leaving only the insertion of a few rivets from inside, into previously made holes, and deforming the collars from outside.

To provide a better understanding of this descriptive report and as an integral part of the report, some drawings are provided below in which the invention is described for illustrative purposes. The drawings are not definitive.

DESCRIPTION OF A PREFERRED EMBODIMENT

Figure 1:
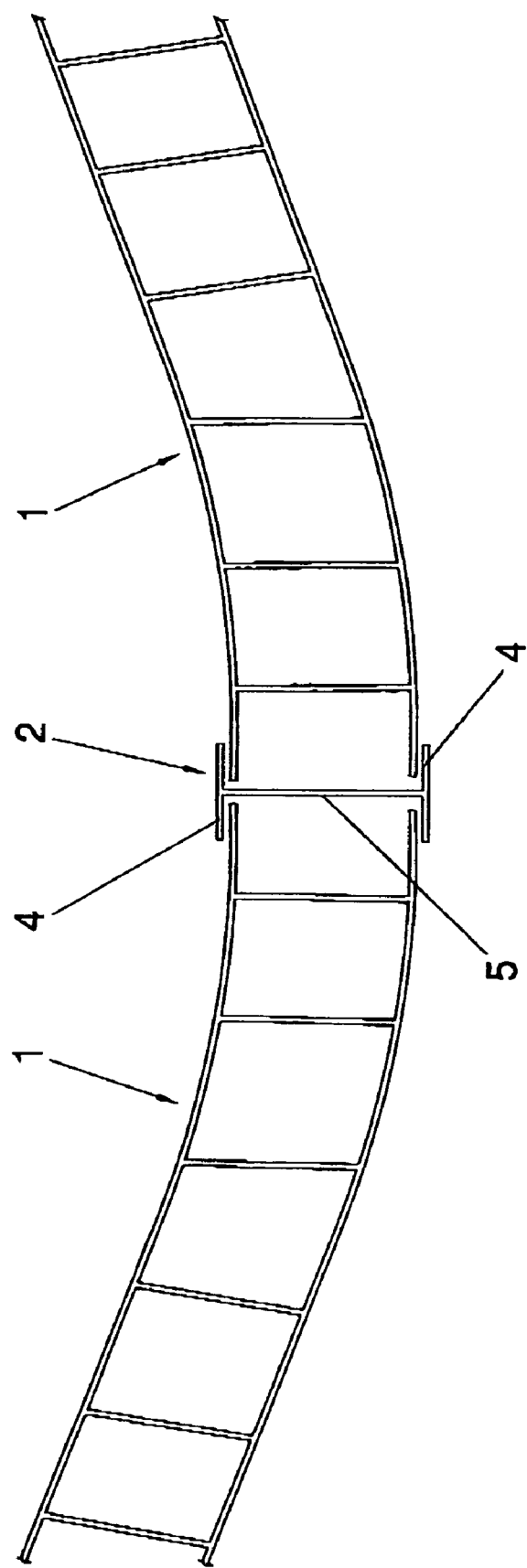
FIG. 1. Shows a view of the structure for aircraft from the front, the structure being the object of the invention. Its application is essentially as a horizontal stabiliser.
Figure 2:
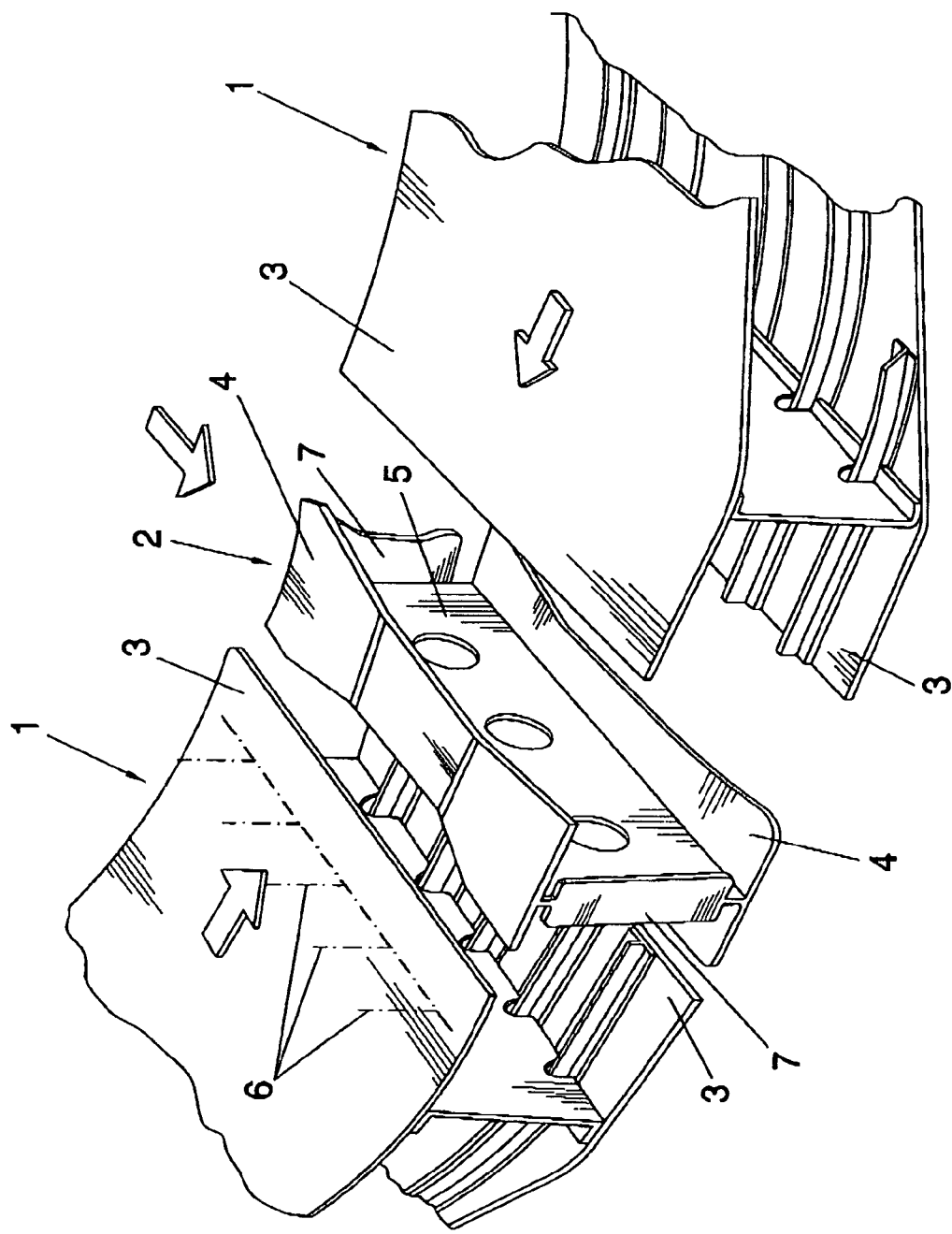
FIG. 2. Shows a view in perspective of a part of the lifting structure of the invention. The view shows an arrangement for joining the two lateral boxes of the stabiliser by means of a characteristic single central piece, in the manner of an integral rib.
Figure 3:
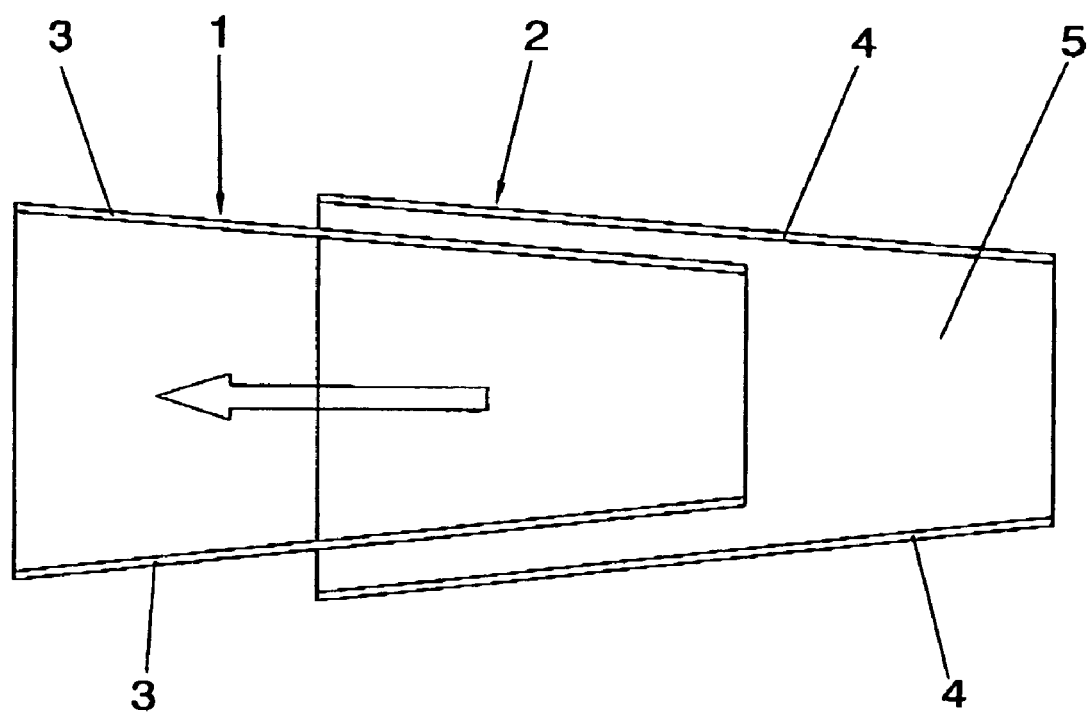
FIG. 3. Shows a view of the mounting of the integral rib onto the lateral boxes.

Using the numbering in the diagrams, the structure for aircraft serves essentially as a horizontal stabilizer and consists of two symmetrical lateral boxes (1) that are joined together by a single, central piece (2) constituting a rib in the form of a double "T", in such a way that the extremities (3) of the boxes (1) overlap the internal faces of the wings (4) of the rib (2), close to the core (5) of the central piece (2).

By being in this position, the three pieces [(1) and (2)] are joined together by means of four areas of rivets (6) that are inserted in pairs in aligned holes made previously in the wings (4) of the central rib (2) and the extremities (3) of the boxes (1).

The central rib (2) incorporates a number of flaps (7) for joining to a number of supports, at the front and at the rear (not shown in the diagrams). The flaps are situated perpendicularly at the extremities of the core (5) of the central rib (2) forming an integral part of it.

In addition, the central rib (2) gradually increases in height from the rear extremity to the front extremity, this variation in height being complemented by the extreme portions (3) of the lateral boxes (1).

The horizontal stabilizer consists of symmetrical boxes (1) that have a characteristic arch that increases in height as it goes outwards, in such a way that in this case the sections at the extremities (3) that overlap with the wings (4) of the central rib (2) are prepared in advance so as to be fitted to the wings (4) of the central rib (2). This preparation consists simply of flattening these end sections (3) so that they sit perfectly on the flat wings (4) of the central rib (2), thereby creating a flat transition.

This transition between the two boxes (1) is made on a surface that is not wet, and does not affect the aerodynamics of the aircraft.

As a result, when the application is used as a horizontal stabilizer with the arched boxes (1) as described, a transition of the surface skin is created that is curved and smooth within the fuselage area, in such a way that it has no effect on the aerodynamics of the aircraft. In this way we achieve a surface ready for a flat joint in the central area.

The rib wing interface angle must be sufficient to ensure union with the rib and ensure that the work of sealing and supplementing can be carried out without pulling on the sealant used. In the front area, this angle must be such that it is possible to install the front part correctly. The central rib will vary in thickness towards the exterior, taking into account the rows of rivets with the skin.

Another detail to be pointed out is that the front opening must be sufficiently large to allow access and the insertion of the rivets in the aligned holes, deforming the rivet collars from outside.

A further detail to be pointed out is that the rib can incorporate the rear and front section stiffeners and angle pieces.

Finally, we must also point out that the assembly system must be compatible with a box assembly system "to aerodynamic tolerances" that locally (in the area of the joint) ensures exterior tolerances that are compatible with the rib. This can be achieved either by means of adding material to the assembly, having designed the sections to be compatible with it, or applying extra material to the support elements of the skin which can be removed if necessary.

The invention claimed is:

1. A LIFTING STRUCTURE FOR A HORIZONTAL STABILIZER OF AN AIRCRAFT, that comprises two lateral boxes, the ends of which join together, mutually supporting one another, in a common central area, wherein the two boxes (1) are joined together by one single, one-piece part that constitutes a central rib (2) with a profile in the form of a double "T", overlapping the extremities (3) of the lateral boxes (1) that come together on interior faces of wings (4) of the central rib (2), the joint being made with rivets (6), wherein the central rib (2) further incorporates, at a front and a rear thereof, a number of flaps (7) for joining to a number of supports, the flaps being situated perpendicular to a core (5) of the central rib (2) at the extremes of the core (5) of the central rib (2) forming an integral part of the central rib (2), and wherein the lateral boxes (1) have an arched profile, the extremities (3) that join together being flat in form, adapted to a flat surface where they overlap with the wings (4) of the central rib (2).

2. A LIFTING STRUCTURE FOR A HORIZONTAL STABILIZER OF AN AIRCRAFT, according to claim 1, wherein the central rib (2) and at least those sections of the lateral boxes (1) that join together gradually increase in height from the rear area towards the front area.

3. A LIFTING STRUCTURE FOR A HORIZONTAL STABILIZER OF AN AIRCRAFT, according to claim 2, wherein the central rib (2) and the lateral boxes (1) are made out of the same carbon fibre material.

4. A LIFTING STRUCTURE FOR A HORIZONTAL STABILIZER OF AN AIRCRAFT, according to claim 1, wherein the central rib (2) and lateral boxes (1) are made out of the same carbon fibre material.

5. A LIFTING STRUCTURE FOR A HORIZONTAL STABILIZER OF AN AIRCRAFT, according to claim 1, wherein the central rib (2) and at least those sections of the lateral boxes (1) that join together gradually increase in height from the rear area towards the front area.

6. A LIFTING STRUCTURE FOR A HORIZONTAL STABILIZER OF AN AIRCRAFT, according to claim 1, wherein the central rib (2) and the lateral boxes (1) are made out of the same carbon fibre material.

7. A LIFTING STRUCTURE FOR A HORIZONTAL STABILIZER OF AN AIRCRAFT, according to claim 1, wherein the flaps (7) are perpendicular to both the core (5) and the wings (4), and the wings (4) are perpendicular to both the core (5) and the flaps (7).

8. A LIFTING STRUCTURE FOR A HORIZONTAL STABILIZER OF AN AIRCRAFT, according to claim 7, wherein the wings (4) are respectively integrally provided at the top and the bottom ends of the core (5), and the flaps (7) are respectively integrally provided at the front and rear ends of the core (5).

9. A LIFTING STRUCTURE FOR A HORIZONTAL STABILIZER OF AN AIRCRAFT, according to claim 1, wherein the wings (4) are respectively integrally provided at the top and the bottom ends of the core (5), and the flaps (7) are respectively integrally provided at the front and rear ends of the core (5).

* * * * *